(12) United States Patent
Reddy

(10) Patent No.: US 7,192,527 B2
(45) Date of Patent: Mar. 20, 2007

(54) PROCESSES FOR REMOVING OIL FROM SOLID WELLBORE MATERIALS AND PRODUCED WATER

(75) Inventor: B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 339 days.

(21) Appl. No.: 10/915,023

(22) Filed: Aug. 10, 2004

(65) Prior Publication Data

US 2006/0032820 A1 Feb. 16, 2006

(51) Int. Cl.
*C02F 1/56* (2006.01)

(52) U.S. Cl. .................. 210/708; 134/25.1; 134/40; 175/66; 210/711; 210/719; 210/727; 210/730; 210/732; 210/735; 210/772

(58) Field of Classification Search ............. 210/711
See application file for complete search history.

(56) References Cited

U.S. PATENT DOCUMENTS

| | | | | |
|---|---|---|---|---|
| 3,716,480 A | 2/1973 | Finley et al. | ................ | 210/22 |
| 3,737,037 A | 6/1973 | Bone, III | ................ | 210/73 |
| 4,599,117 A | 7/1986 | Luxemburg | ................ | 134/25.1 |
| 4,645,608 A | 2/1987 | Rayborn | ................ | 252/8.51 |
| 4,938,876 A | 7/1990 | Ohsol | ................ | 210/706 |
| 5,090,498 A | 2/1992 | Hamill | ................ | 175/206 |
| 5,204,452 A | 4/1993 | Dingilian et al. | ................ | 530/420 |
| 5,271,463 A | 12/1993 | Jennings, Jr. | ................ | 166/271 |
| 5,336,415 A | 8/1994 | Deans | ................ | 210/725 |
| 5,362,717 A | 11/1994 | Dingilian et al. | ................ | 514/55 |
| 5,582,118 A | 12/1996 | Atkins et al. | ................ | 110/346 |
| 5,759,410 A * | 6/1998 | Christ et al. | ................ | 210/711 |
| 6,059,977 A | 5/2000 | Rowney et al. | ................ | 210/710 |
| 6,179,071 B1 | 1/2001 | Dietzen | ................ | 175/66 |
| 6,267,893 B1 | 7/2001 | Luxemburg | ................ | 210/723 |
| 6,846,420 B2 * | 1/2005 | Reddy et al. | ................ | 210/710 |
| 2004/0118784 A1 | 6/2004 | Reddy et al. | ................ | 210/723 |

FOREIGN PATENT DOCUMENTS

EP 0 084 411 B1 9/1985

* cited by examiner

*Primary Examiner*—Peter A. Hruskoci
(74) *Attorney, Agent, or Firm*—Craig W. Roddy; Conley Rose, P.C.

(57) ABSTRACT

Processes for removing oil from a solid wellbore material such as drill cuttings or water such as produced by a subterranean formation include contacting the solid material/water with an amino-substituted polymer such as chitosan and a halogenating agent. The oil separates from the solid material and becomes bound within a flocculated solid. The flocculated solid containing the oil subsequently may be combined with a solvent of the amino-substituted polymer. Further, the flocculated solid may be contacted with a reducing agent, converting the flocculated solid back into the amino-substitute polymer and forming an oil-phase separate from the solvent-phase. The oil-phase may then be separated from the solvent phase and recovered. The solvent in which the amino-substituted polymer is dissolved may be recycled for treating more solid material removed from the well bore.

21 Claims, No Drawings

US 7,192,527 B2

PROCESSES FOR REMOVING OIL FROM SOLID WELLBORE MATERIALS AND PRODUCED WATER

CROSS-REFERENCE TO RELATED APPLICATIONS

The subject matter of the present application is related to U.S. Pat. No. 6,846,420, issued on Jan. 25, 2005, and entitled "Process for Removing Oil from Solid Materials Recovered from a Well Bore," which is incorporated by reference herein.

FIELD OF THE INVENTION

This invention generally relates to oil/gas well drilling, cementing, and production operations. More specifically, the invention relates to processes for removing oil from solid materials such as drill cuttings and sand removed from a well bore and from produced water.

BACKGROUND OF THE INVENTION

Well drilling is a process used in penetrating subterranean zones (also known as subterranean formations) that produce oil and gas. In well drilling, a well bore is drilled while a drilling fluid (also known as a drilling mud) is circulated through the well bore. The drilling fluid is typically an oil-based fluid comprising oils such as diesel, mineral oil, unsaturated olefins, and organic esters. After drilling the well bore to a desired depth, a string of pipe, e.g., casing, is usually run in the well bore. The drilling fluid in the well bore may be conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set into a hard mass to thereby attach the string of pipe to the walls of the well bore and seal the annulus.

During the drilling process, the drill bit generates drill cuttings as it forms the well bore. Drill cuttings consist of small pieces of shale and rock. The drill cuttings are carried in a return flow stream of the drilling fluid back to the well drilling platform. They are then separated from the bulk of the drilling fluid via conventional separators such as shale shakers, mud cleaners, and centrifuges. Some shale shakers filter coarse material from the drilling fluid while other shale shakers remove finer particles from the drilling fluid. After removing the drill cuttings therefrom, the drilling fluid may be re-used in the drilling process.

The drill cuttings separated from the bulk drilling fluid typically are discharged from the drilling platform to the surrounding area. Drilling platforms are often located offshore in hundreds of feet of water filled with marine life. The drill cuttings thus accumulate in the seabed near the base of the platform. Unfortunately, the drill cuttings may be contaminated with the oil contained in the drilling fluid. This oil must be removed from the drill cuttings before their disposal to meet regulatory limitations. Otherwise, the oil would pollute the surrounding environment and would be particularly hazardous to marine life.

In addition, the crude oil recovered from the subterranean formations often contains sand that must be separated from the oil. Like the drill cuttings, the sand is disposed of by dumping it from the drilling platform into the seabed where it forms sand piles. The sand also may be undesirably coated with the produced crude oil. Thus, the sand could adversely affect the marine environment unless the oil is removed therefrom.

Various methods have been used to remove oil from drill cuttings and sand, thereby meeting certain regulations designed to protect the environment from oil pollution. In one method, the oil is extracted using solvents such as toluene or methylene chloride. However, the potential hazards caused by the toxic nature of the solvents have raised doubts about this method. Another method involves transporting the drill cuttings and the sand onshore and subjecting them to a thermal process. Using such a thermal process can be very expensive, particularly since it is necessary to transport the drill cuttings and the sand to an onshore location.

An improved method has been developed to separate the oil from solid material removed from a wellbore, such as drilling cuttings and sand. In this method, the solid material is passed from the well bore to a separation zone located on or near the drilling platform, thus avoiding the high costs associated with transporting the solid material onshore. Chitosan, water, and a halogenating agent such as bleach are introduced to the separation zone containing the solid material, leading to the formation of a flocculated solid that surrounds oil droplets. As a result, the oil becomes trapped in the flocculated solid such that it is no longer disposed on the solid material. The solid material can then be separated from the flocculated solid and discharged from the drilling platform without being concerned that the surrounding environment could be harmed.

To avoid contaminating the environment with the oil contained in the flocculated solid, the flocculated solid can be collected and properly disposed. It may be transported to an onshore location and incinerated at relatively high temperatures. The costs of transporting the flocculated solid and incinerating it and the oil bound therein can be relatively high. Thus, it is desirable to separate the oil from the flocculated solid such that the oil may be recovered, thus avoiding the problems associated with its disposal. A need therefore exists for an environmentally friendly, economical, and simple method of recovering the oil from the flocculated solid.

SUMMARY OF THE INVENTION

Oil may be removed from a solid material (e.g., drill cuttings) recovered from a well bore or from water such as produced by a subterranean formation by contacting the solid material/water with a polymer substituted with an amino group such as chitosan and a halogenating agent such as sodium hypochlorite. As a result of such contact, at least a portion of the oil separates from the solid material/water and becomes bound within a flocculated solid formed from the polymer. The flocculated solid containing the oil may then be combined with a solvent of the polymer substituted with the amino group. Further, the flocculated solid may be contacted with a reducing agent, resulting in the removal of the oil from the flocculated solid and the formation of an oil-phase separate from the solvent-phase. The oil-phase may then be separated from the solvent phase and recycled in, e.g., a drilling fluid, or recovered as product. In an embodiment, a process for recovering oil disposed on a solid material removed from a well bore is disclosed. The process comprises flocculating a polymer substituted with an amino group with a halogenating agent to bind the oil and deflocculating the polymer with a reducing agent to release the oil.

DETAILED DESCRIPTION OF THE PREFERRED EMBODIMENTS

Processes for recovering oil disposed on a solid material taken from a wellbore first involve removing the oil from the solid material. This separation of the oil may be accomplished by passing the solid material from the well bore to a separation zone and introducing water, a polymer substituted with an amino group (hereinafter "amino-substituted polymer"), and a halogenating agent to the separation zone. Optionally, one or more surfactants may also be introduced into the separation zone. Examples of solid materials to which such processes may be applied include drill cuttings carried from a well bore via a stream of drilling fluid and sand carried from a well bore via a stream of crude oil. Before carrying out the oil recovery processes described herein, separation techniques known in the art could be used to separate the drill cuttings from the bulk drilling fluid or the sand from the bulk crude oil.

The separation zone may be disposed in processing equipment suitable for combining the components as described herein, such as vessels, tanks, mixers, conveyors, and combinations thereof. The separation zone is preferably disposed within a settling tank. The components may be combined and mixed in any sequence yielding the desired results described herein. Suitable operating conditions for the separation zone, e.g., the operating temperature and pressure, would be obvious to those skilled in the art.

In an embodiment, the solid material is loaded into the separation zone, and the surfactant, the water, the amino-substituted polymer, and the halogenating agent are subsequently combined and mixed, preferably in the order indicated. The aqueous particle suspension formed prior to the addition of the halogenating agent is vigorously mixed. In another embodiment in which a surfactant is not used, water is initially charged to the separation zone, to which the solid material, amino-substituted polymer, and halogenating agent are added. Alternatively, one or more surfactants may be added to the water along with the other components. In yet another embodiment, the solid material is coated with the surfactant by, for example, spraying the surfactant on the solid material or mixing the solid material in the surfactant. The solid material is then vigorously mixed with water in the separation zone, followed by the addition of the amino-substituted polymer and the halogenating agent while mixing.

After the addition of all of the components to the separation zone, the pH of the final mixture may be adjusted to a value in the range of from about 3 to about 7 by the addition of suitable acids or bases. The mixture is then agitated while the amino-substituted polymer reacts with the halogenating agent, thus ensuring that the product of the reaction (i.e., an aminohalide polymer) is formed in intimate contact with the solid material. The mixture is then allowed to stand for a period of time sufficient to remove at least a portion of the oil from the solid material. For example, depending on the halogenating agent used, the mixture may be allowed to stand for a period sufficient to allow for suspension of a newly formed flocculated solid. Three phases form as a result of this process: an aqueous phase that is substantially free of the oil; the solid material having a reduced amount of oil thereon; and one or more flocculated solids in which the oil removed from the solid material is bound. The solid material usually settles to the bottom of the aqueous phase while the flocculated solids float near the top of the aqueous phase. The amount of oil present in the solid material desirably meets government regulations, thus allowing it to be disposed of onsite. In an embodiment, the foregoing process for removing the oil from the solid material may be repeated as many times as necessary to reduce the amount of oil to within government regulations. Accordingly, the solid material being disposed of preferably contains no greater than about 8% oil based on the weight of the solid material, more preferably no greater than about 3% oil, and most preferably no greater than about 1% oil.

Without intending to be limited by theory, it is believed that the oil is removed from the solid material via the formation of one or more flocculated solids. As used herein, "flocculated solid" refers to a structure comprising an aggregation of charged dispersed particles caused by the reduction of the charge on each dispersed particle. The flocculated solids are formed as a result of the amino (e.g., $NH_2$—) substituted polymer being oxidized by the halogenating agent. Thus, the halogenating agent serves as an oxidizing agent that causes the hydrogen in the N—H bonds of the amino groups to be replaced with the electronegative atoms (e.g., oxygen, nitrogen, or a halogen such as fluorine or chlorine) of the halogenating agent. Unlike the amino-substituted polymer, the flocculated solids are insoluble in the aqueous phase. The flocculated solids are also less dense than water and thus float at or near the surface of the aqueous phase.

The amount of water introduced to the separation zone may be effective to provide a total volume of liquid components (e.g, water, surfactant, amino-substituted polymer, and halogenating agent) sufficient to thoroughly wet, and preferably submerge, the solid material present in the separation zone. In an embodiment, the water is fresh water. The amount of the amino-substituted polymer introduced to the separation zone is effective to remove substantially all of the oil from the solid material. For example, the amount of the amino-substituted polymer may range from about 0.3% to about 30% by weight of the solid material, alternatively from about 0.5% to about 10% by weight of the solid material. Examples of suitable amino-substituted polymers include polyvinylamine, polyalkyleneimines such as polyethyleneimine and polypropyleneimine, polylysine, polymyxin, chitosan, a copolymer of vinylamine and vinylalcohol, and combinations thereof.

In a preferred embodiment, the amino-substituted polymer is chitosan, which is a non-toxic, biodegradable polymer. Chitosan is derived from chitin, which is a naturally-occurring polymer of beta-1,4-(2-deoxy-2-acetamidoglucose). Chitin is a primary constituent of the supporting tissues and exoskeletons of anthropods and insects and the cell walls of many fungi. Living organisms, particularly sea crustacea such as crabs, shrimps, and lobsters, produce millions of tons of chitin every year. Chitosan is derived from chitin by hydrolysis of some 2-deoxy-2-acetamidoglucose units to 2-deoxy-2-aminoglucose units. The term "chitosan" generally refers to copolymers having greater than 65% 2-deoxy-2-aminoglucose monomeric units, with the remainder monomeric units being 2-deoxy-2-acetamidoglucose units. The chitosan preferably is dissolved in an aqueous acidic solution before introducing it to the separation zone. A preferred aqueous acidic solution comprises about 1% acetic acid based on the combined weight of the acetic acid and the water. A preferred chitosan solution is poly N-acetylglucosamine, which is at least 65% deacetylated, dissolved in an acetic acid solution. Alternatively, chitosan in the solid form may be purchased from Vanson Company of Redmond, Wash., USA under the tradename KLARIFY 101. Within the separation zone, the chitosan is present in the aqueous acidic solution as a polycation with the protonated amino group bearing a positive charge. The protonated amino group bonds with the halogen provided by the halogenating agent, thus becoming less polar. As a result of the reaction of the chitosan with the halogenating agent, at least a portion of the 2-deoxy-2-aminoglucose monomeric units of the chitosan are converted to 2-mono or 2,2-dihalo aminoglucose monomeric units to yield a new polymer known as N-halochitosan. To optimize the rate of reaction and to minimize the decomposition of the N-halochitosan product, the separation zone is maintained at a temperature preferably in the range of from about 0° C. to about 80° C., and more preferably in the range of from about 15° C. to about 30° C. Additional disclosure regarding the preparation of N-halochitosans can be found in U.S. Pat. No. 5,362,717; and U.S. Pat. No. 5,204,452, which are incorporated herein in their entirety.

In an alternative embodiment, the amino-substituted polymer is polyethylenimine. In an embodiment, the polymer comprises branched polyethylenimine obtained by polymerizing aziridine. In another embodiment, the polymer comprises non-branched polyethylenimine. When a polyethylenimine solution in water is used, it is preferably reacted with the halogenating agent prior to the adjustment of pH to prevent the precipitation of the former at acidic pH.

A halogenating agent or combination of halogenating agents suitable for reacting with and halogenating or oxidizing the amino-substituted polymer to form a haloamino polymer may be used. As used herein, "halogenating agent" refers to a compound having a halogen bound to a strongly electronegative atom such as oxygen, nitrogen, or another more electronegative halogen such as fluorine. The halogenating agent is preferably introduced to the separation zone in an amount effective to achieve from about 30% to about 100% conversion of the amino-substituted polymer. Examples of suitable halogenating agents include sodium hypochlorite, calcium hypochlorite, chlorine, bromine, N-chlorosuccinimide, sodium hypobromite, pyridinium bromide perbromide, N-bromosuccinimide, chloramine-T, and combinations thereof. In preferred embodiments, the halogenating agent is sodium hypochlorite, which is readily available and relatively inexpensive. The sodium hypochlorite is preferably introduced to the separation zone in an aqueous solution. When sodium hypochlorite is reacted with chitosan to form N-halochitosan, the reaction is usually complete in less than about about 10 minutes. Less reactive halogenating agents such as N-bromosuccinimide may require about 30 to 60 minutes, or even longer depending on the temperature, to complete the reaction.

In an alternative embodiment, a surfactant or combination of surfactants suitable for promoting the removal of oil from the solid material may be used. By way of example, the amount of surfactant introduced to the separation zone may range from about 0.1% to about 20% by weight of the solid material, from about 2% to about 15% by weight of the solid material, or from about 3% to about 10% by weight of the solid material. The surfactant may be nonionic, anionic or cationic; however, a non-ionic surfactant is preferred. The ability of a surfactant to emulsify two immiscible fluids, such as oil and water, is often described in terms of hydrophile-Lipophile balance (HLB) values. These values, ranging from 0 to 40, are indicative of the emulsification behavior of a surfactant and are related to the balance between hydrophilic and lipophilic portions of the molecules. In general, surfactants with higher HLB values are more hydrophilic than those with lower HLB values. As such, they are generally more soluble in water and are used in applications where water constitutes the major or external phase and a less polar organic fluid constitutes the minor or internal phase. Thus, for example, surfactants with HLB values in the range 3–6 are suitable for producing water-in-oil emulsions, whereas those with HLB values in the 8–18 range are suitable for producing oil-in-water emulsions. A commonly used formula for calculating HLB values for nonionic surfactants is given below:

$$HLB = 20 \times M_H/(M_H + M_L)$$

where $M_H$ is the formula weight of the hydrophilic portion of the molecule and $M_L$ is the formula weight of the lipophilic portion of the molecule. When mixtures of surfactants are used, the overall HLB values for the mixture is calculated by summing the HLB contributions from different surfactants as shown in equation below:

$$HLB = (\phi_1 \times HLB_1 + \phi_2 \times HLB_2 + \ldots + \ldots \text{etc.,})$$

where $\phi_1$ is the weight fraction of surfactant # 1 in the total mixture, $HLB_1$ is the calculated HLB value of surfactant #1, $\phi_2$ is the weight fraction of surfactant #2 in the total surfactant mixture, and $HLB_2$ is the calculated HLB value of the surfactant #2, and so on.

It has been observed that a mixture of a preferentially oil-soluble surfactant and a preferentially water-soluble surfactant provides better and more stable emulsions. As such, these types of mixtures may be used to further reduce the oil-content on the solid material. In particular, non-ionic ethoxylated surfactant mixtures containing from about 3 to about 12 moles of ethylene oxide, exemplified by nonylphenol ethoxylates containing from about 4 moles to about 10.5 moles of ethylene oxide are preferred. The HLB ratio for a single surfactant or a surfactant mixture employed to assist in the removal of the oil preferably ranges from about 7 to about 16, more preferably from about 8 to about 15.

The recovery of the oil previously disposed on the solid material next involves separating the aqueous phase, the solid material, and the one or more flocculated solids. Suitable separation techniques would be known to those skilled in the art. For example, the flocculated solids may be skimmed from the top of the aqueous phase, followed by decanting the aqueous phase, thereby leaving behind the solid material in a wet state. Devoid of the oil, the solid material may be discharged from the drilling platform without being concerned that the surrounding environment could be harmed. Alternatively, it may be disposed of in a landfill.

The oil bound within the flocculated solids may then be removed by combining within a separation zone the flocculated solids with a reducing agent and a relatively good solvent of the amino-substituted polymer previously used to form the solids. Suitable solvents are capable of dissolving the amino-substituted polymer and are immiscible with oil. The flocculated solids, the reducing agent, and the solvent may be introduced to the separation zone in any sequence or combination. The reducing agent may be introduced to the separation zone directly or in a solution such as an aqueous solution, which may contain a miniscule amount of the reducing agent up to a saturated amount of the reducing agent. Examples of suitable reducing agents include ascorbic acid; alkali metal and ammonium salts of sulfite, bisulfite, dithionite, metabisulfite, and thiosulfate anion; sodium borohydride; potassium borohydride; sodium triacetoxyborohydride; potassium triacetoxyborohydride; and combinations thereof. The solvent may be, for example, water and is preferably acidic water containing organic acids such as acetic and lactic acids. The volume of solvent placed in the separation zone is sufficient to thoroughly wet and preferably submerge the flocculated solids.

The separation zone employed for recovering the oil from the flocculated solids may be contained within processing equipment suitable for combining the above components, such as vessels, tanks, mixers, conveyors, and combinations thereof. The separation zone is desirably disposed in a stirred tank equipped with outlets to skim off the oil and drain the aqueous layers. While agitating the materials therein, the separation zone is maintained at operating conditions suitable for causing the flocculated solids to be reduced by the reducing agent. In an embodiment, the separation zone is maintained at atmospheric temperature and pressure. The reduction of the flocculated solids thereby converts them back into an amino-substituted polymer in which the amino groups are bonded to hydrogen rather than electronegative atoms. As such, at least a portion of the flocculated solids disappears, and the amino-substituted polymer that forms becomes dissolved in the solvent. Further, the oil that had been bound within the flocculated solids forms its own oil-phase separate from and above the solvent-phase. If all of the flocculated solids have not disappeared, additional amounts of the reducing agent may be introduced to the separation zone. The total amount of the reducing agent introduced to the separation zone is effective to release all of the oil from the flocculated solids, as indicated by the disappearance of substantially all of the flocculated solids.

If desired, surfactants which can de-emulsify or lower interfacial tension (IFT) among dispersed oil droplets to cause coalescence of the oil droplets may optionally be introduced to the separation zone to improve the separation between the oil-phase and the solvent-phase by inhibiting or reducing the formation of an interface layer comprising an oil/solvent emulsion. Additionally, salt may be optionally added to augment the oil/water separation and to enhance the performance of the surfactants. Examples of suitable surfactants include alcohol ether sulfates in which the hydrophobic group may comprise linear or branched alkly groups or alkylated aryl groups, alkylated diphenylether disulfonates, alpha-olefin alkylaryl sulfonates, and combinations thereof. Examples of such surfactants that are commercially available include: NEA-96, MOREFLO, AS-10, and LOW SURF 300, all available from Halliburton Energy Services, Inc.; DOWFAX 8390 available from Dow Chemical Company; and ISOFOL 145-4PO available from Condea Vista Company of Houston, Tex. The amounts of the de-emulsifying or IFT reducing surfactant and/or salt introduced to the separation zone is preferably sufficient to achieve a clean separation of the oil-phase and the solvent-phase such that the oil/solvent interface layer is minimized.

The oil-phase may be separated from the solvent-phase using known separation techniques for separating immiscible liquids. For example, the oil-phase may be skimmed off of the solvent-phase or decanted. Alternatively, the solvent-phase may be drained out of the bottom of the vessel or tank in which it is contained. The oil may be recovered without having to perform difficult purification steps on the oil, which can be used for various purposes including the formation of an oil-based drilling fluid. The oil can also be recovered as product. Moreover, the solvent containing the amino-substituted polymer also can be recycled for use in removing yet more oil from solid material recovered from a wellbore, such as drill cuttings and sand. Recovering the oil in the manner described above is therefore efficient and economical. It also eliminates the need to dispose of the oil properly in accordance with government regulations.

The processes described above for removing oil from solid materials may be followed to also remove oil from water, for example water produced from a subterranean formation, with the exception that additional water need not be introduced to the separation zone. Such water may be produced along with oil that is being recovered from a well that penetrates a subterranean formation. The water is more likely to be produced after the well matures and oil has been recovered therefrom for a relatively long period of time. The water may also be contained in oil recovered as a result of stimulation operations such as fracturing and acidizing.

After contacting the water with a polymer substituted with an amino group and a halogenating agent to cause at least a portion of the oil to become bound within a flocculated solid, the processes described above for separating the water, the flocculated solid, and the oil may also be applied. That is, the flocculated solid may be combined with a solvent of the polymer substituted with the amino group. As a result, at least a portion of the oil separates out into an oil-phase. The water from which the oil is removed may be used for various purposes or disposed of without being concerned that it could contaminate the environment. It may contain from about 0.5% to about 20% oil by weight of the water.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Comparative Example 1

A sample of a base oil used in a drilling fluid commercially available from Halliburton, Inc. under the tradename ACCOLADE™ was obtained. A milliliter of the oil was added to 100 milliliters (mL) of tap water, emulsified with high speed agitation for 1 minute, and set aside for 15 minutes. An identical emulsion was prepared in a separate beaker and to this emulsion, 10 mL of a 1 weight (wt.) % solution of chitosan prepared in a 1 wt. % acetic acid solution was added, stirred, and set aside. A third batch of identical emulsion was prepared and 10 mL of the 1 wt. % chitosan solution was added while stirring, followed by adding 10 mL of sodium hypochlorite solution (5 wt. % sodium hypochlorite solution is typically sold as household bleach). In 15–30 minutes, the beaker containing chitosan and bleach solution contained white flocculated solid floating on completely clear water. The other two beakers contained uniform milky emulsions. The milky emulsions were stable and did not show any signs of separation even after 48 hours. The beaker containing the flocculated solid was filtered, followed by drying the solid at room temperature. A thermal gravimetric analyses (TGA) of the dried solid and of a sample of the oil was taken using a Hi-Res TGA 2950 Thermogravimetric Analyser manufactured by TA Instruments of New Castle, Del., USA. The TGA showed that the filtered flocculated solid contained the oil used in the emulsion.

Comparative Example 2

An emulsion identical to the one described in Comparative Example 1 was prepared in 100 mL of water. Enough polyethylenimine concentrate (33 wt. % solution) was added to the emulsion with stirring, followed by adding 10 mL of sodium hypochlorite solution to the emulsion and setting the resulting mixture aside. An identical mixture was prepared in a separate beaker, and the pH of the mixture was lowered to 5.5 with glacial acetic acid. After about 18 hours, the beaker containing the emulsion mixture at a lower pH showed flocculated solid floating in water, whereas the beaker containing emulsion mixture at a higher pH did not show any tendency to form flocculated solid.

Example 1

A 20/40 mesh (U. S. Series) graded sand was contacted with ACCOLADE™ drilling fluid for several hours, followed by physically separating the sand from the drilling fluid. A sample of the sand, which was coated with the drilling fluid when tested by the TGA method, was found to contain 10.3% volatiles by weight of the sand in the 25° C. to 500° C. range.

Another 1 gram sample of the sand contacted with the ACCOLADE™ drilling fluid was suspended in 100 mL of water and vigorously agitated for one minute. A 10 mL sample of 1 wt. % chitosan solution in a 1 wt. % acetic acid solution was added while stirring, followed by adding 10 mL of a bleach solution containing 5 wt. % sodium hypochlorite to induce the removal of oil from the sand sample. After the oil in the sand sample had been removed, the sand sample was collected by decantation. TGA analysis of the collected sand showed that all the volatiles from the drilling fluid had been removed by the treatment.

During the oil removal process, a suspended solid phase containing the oil removed from the sand sample was formed. The suspended solid phase was tested by TGA to determine the amount of oil present in the suspended solid phase. The results showed that the suspended solid contained 56% by total weight of the oil removed from the sand. This amount accounts approximately for all the volatiles removed from the sand.

Comparative Example 3

A field sample of cuttings collected during drilling in the Chesapeake area using a typical diesel based drilling fluid was obtained for use as a control sample. The control sample was then analyzed by TGA. As indicated in Table 1 below, the TGA showed 15.3% volatiles by weight of the cuttings in the 75–200° F. range and 17.3% volatiles by weight of the cuttings in the 75–475° F. range.

Examples 2–9

In Example 2, the procedure used was identical to that used in Example 1 with the exception of using a field sample of cuttings. In Examples 3 and 5–9, one or more surfactants were added directly to the drill cuttings, followed by the addition of water with vigorous stirring, followed by the addition of the chitosan solution and bleach solution as described in Example 1. In Example 4, Surfactant A was added to water, and the rest of the procedure was the same as described in Example 1. Surfactant A is a nonylphenol ethoxylate containing 4 moles of ethylene oxide (calculated HLB value=8.8), and Surfactant B is a nonylphenol ethoxylate containing 10.5 moles of ethylene oxide (calculated HLB value=13.6), both of which are available from Union Carbide Corporation as TERGITOL NP 4 and TERGITOL NP 10, respectively. Table 1 below shows the amount of each surfactant added to the drill cuttings.

After treatment, the drill cuttings were separated from the aqueous layer of the removed oil. Additional water was used to rinse the decanted cuttings. The cuttings were dried at room temperature and analyzed by TGA to determine the weight % of oil remaining after treatment. The results of the TGA analysis are also shown in Table 1. The volatile portion in the 75–200° F. range presented in Table 1 represents the base oil present in the drilling fluid. Any material volatilized in the 200–475° F. range represents the drilling fluid components, which are less volatile and typically consist of emulsifiers and calcium salts present in the internal aqueous phase. Such materials are not considered particularly hazardous compared to the base oil. In Table 1, the total volatile content of the treated cuttings in the 75–475° F. and in the 75–200° F. range are presented. A portion of the treated cuttings were lost in the suspended solid because of their extremely small particle sizes, which prevented their settling.

TABLE 1

| Example | Surfactant A (% by weight of cuttings) | Surfactant B (% by weight of cuttings) | Surfactant Application Method | Wt. % Oil Residue (volatile portion between 75°–200° F.) | Wt. % Oil Reduction on the Cuttings | Wt. % Total Residue Volatized between 75° and 475° F. | Wt. % Total Volatile Reduction Due to Treatment |
|---|---|---|---|---|---|---|---|
| Control (Untreated) | — | — | — | 15.3 | — | 17.3 | — |
| 2 | None | None | None | 4.0 | 73 | 7.6 | 58 |
| 3 | 10 | None | Coat | 3.2 | 79 | 13.9 | 20 |
| 4 | 10 | None | Solution | 3.7 | 76 | 9.3 | 46 |
| 5 | None | 10 | Coat | 2.7 | 82 | 6.1 | 65 |
| 6 | 5 | 5 | Coat | 1.0 | 93 | 4.6 | 73 |
| 7 | 2.4 | 0.6 | Coat | 2.3 | 85 | 6.2 | 64 |
| 8 | 8 | 2 | Coat | 4.0 | 74 | 13.3 | 23 |
| 9 | 2 | 8 | Coat | 0.93 | 94 | 4.8 | 72 |

The data in Table 1 indicates that the oil content of the treated cuttings in Example 2 was reduced by 73 wt. % due to treatment with chitosan and bleach solution without using any surfactants. The overall reduction of the total volatile content of the treated cuttings in Example 2 was 58wt. %. A comparison of the results from Examples 3 and 4 suggests that the surfactant can be applied either in solution form or as a pre-coat on the cuttings prior to treatment with chitosan and bleach solution. The results indicate slightly better performance in oil reduction (see volatile content loss in 75–200° F.) when the surfactant is applied as a pre-coat. The results from Example 5 suggest that using a surfactant with a higher HLB value, i.e., Surfactant B, is more effective in reducing both the oil content and the total volatile content when compared to Surfactant A in Example 3. The results from Examples 6–9 also show that using mixtures of the two surfactants is more effective than using each surfactant individually in similar or significantly reduced amounts.

Example 10

Some of the flocculated solid samples prepared in Comparative Example 1 were collected by filtration and redispersed in an aqueous solution containing 1% acetic acid by weight of solution. Then 25 mL aliquots of the suspension were placed in test tubes. Various reducing agents such as sodium bisulfite, sodium sulfite, or ascorbic acid were thereafter added to some samples, non-reducing agents such as citric acid or sodium bisulfate were added to other samples, and a surfactant such as LOW SURF 300 was added to some samples, e.g., sodium sulfite and LOW SURF 300. The test tubes were subjected to vigorous shaking, and the disappearance of the flocculated solid and the appearance of the oil layer were observed. In the samples containing the reducing agents, the oil layer formed above the water layer. In the samples containing the non-reducing agents, the oil and water remained mixed rather than separating into distinct layers. Surfactants such as LOW SURF 300 surfactant available from Halliburton Energy Services, Inc. helped with the phase separation in samples containing a reducing agent.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process for recovering oil disposed on a solid material removed from a well bore, comprising:
   (a) contacting the solid material with a polymer substituted with an amino group and a halogenating agent, thereby causing at least a portion of the oil to separate from the solid material and become bound within a flocculated solid formed from the polymer;
   (b) combining the flocculated solid with a solvent that is immiscible with oil and capable of dissolving the polymer substituted with the amino group;
   (c) contacting the flocculated solid with a reducing agent to form an oil-phase and a solvent-phase containing the polymer; and
   (d) recovering oil from the oil-phase.

2. The process of claim 1 wherein the solvent comprises water.

3. The process of claim 1 wherein the polymer substituted with the amino group comprises chitosan, polyvinylamine, a copolymer of vinylamine and vinylacohol, polyethylenimine, polylysine, polymyxin, or combinations thereof.

4. The process of claim 1 wherein the halogenating agent comprises sodium hypochlorite, calcium hypochlorite, chlorine, bromine, N-chlorosuccinimide, sodium hypobromite, pyridinium bromide, perbromide, N-bromosuccinimide, chloramine-T, or combinations thereof.

5. The process of claim 1, wherein the reducing agent comprises ascorbic acid, an alkali metal or ammonium salt of a sulfite, bisulfite, dithionite, metabisulfite, or thiosulfate anion, sodium borohydride, potassium borohydride, sodium triacetoxyborohydride, potassium triacetoxyborohydride, or combinations thereof.

6. The process of claim 1, wherein said contacting the flocculated solid with the reducing agent forms the polymer substituted with the amino group from the flocculated solid, and wherein at least a portion of the polymer substituted with the amino group dissolves in the solvent.

7. The process of claim 6, further comprising separating the oil-phase from the solvent and recovering the oil-phase.

8. The process of claim 1, further comprising separating the oil-phase from the solvent and recovering the oil-phase.

9. The process of claim 7, further comprising recycling the solvent in which the polymer substituted with the amino group is dissolved for treating more solid material removed from the well bore.

10. The process of claim 1, further comprising introducing a de-emulsifying or interfacial tension reducing surfactant to the solvent to improve the separation of the oil-phase from the solvent.

11. The process of claim 10, further comprising introducing a salt to the solvent to enhance performance of the surfactant.

12. The process of claim 1, wherein the reducing agent is in an aqueous solution when it is put in contact with the flocculated solid.

13. The process of claim 1 wherein the solid material comprises drill cuttings recovered from the well bore.

14. The process of claim 1 wherein the solid material comprises sand recovered from the well bore.

15. The process of claim 1, further comprising disposing of the solid material offshore.

16. A process for recovering oil disposed on a solid material removed from a well bore, comprising:
   (a) while in contact with the solid material, flocculating a polymer substituted with an amino group with a halogenating agent to remove at least a portion of the oil from the solid material and bind the oil in a flocculated solid formed by the polymer;
   (b) forming an oil-phase and a solvent-phase containing the amino-substituted polymer by flocculating the amino-substituted polymer by contacting the flocculated solid with a reducing agent and a solvent that is immiscible with oil and capable of dissolving the amino-substituted polymer; and
   (c) recovering oil from the oil-phase.

17. The process of claim 16, wherein the polymer substituted with the amino group comprises chitosan, polyvinylamine, a copolymer of vinylamine and vinylalcohol, polyethylenimine, polylysine, polymyxin, or combinations thereof.

18. The process of claim 16, wherein the halogenating agent comprises sodium hypochlorite, calcium hypochlorite, chlorine, bromine, N-chlorosuccinimide, sodium hypobromite, pyridinium bromide, perbromide, N-bromosuccinimide, chloramine-T, or combinations thereof.

19. The process of claim 16, wherein the reducing agent comprises ascorbic acid, an alkali metal or ammonium salt of a sulfite, bisulfite, dithionite, metabisulfite, or thiosulfate anion, sodium borohydride, potassium borohydride, sodium triacetoxyborohydride, potassium triacetoxyborohydride, or combinations thereof.

20. The process of claim 16, further comprising introducing a solvent to the flocculated polymer before said deflocculating.

21. The process of claim 20, wherein said deflocculating forms an oil-phase separate from a solvent-phase.

\* \* \* \* \*